United States Patent [19]

Jackson

[11] 4,298,160
[45] Nov. 3, 1981

[54] SOLID BOWL DECANTER CENTRIFUGES

[75] Inventor: Joseph F. Jackson, Halifax, England

[73] Assignee: Thomas Broadbent & Sons Limited, Huddersfield, England

[21] Appl. No.: 63,651

[22] Filed: Aug. 3, 1979

Related U.S. Application Data

[63] Continuation-in-part of Ser. No. 908,437, May 22, 1978, abandoned.

[51] Int. Cl.³ .......................... B04B 1/00; B04B 3/00; B04B 5/00
[52] U.S. Cl. .................................. 233/7; 233/14 R; 233/27
[58] Field of Search .................... 233/27, 7, 1 R, 1 D, 233/12, 14 R

[56] References Cited

U.S. PATENT DOCUMENTS

| | | | |
|---|---|---|---|
| 2,679,974 | 6/1954 | Gooch | 233/7 |
| 3,098,820 | 7/1963 | Gooch | 233/7 |
| 3,200,068 | 8/1965 | Jonakin et al. | 233/7 X |
| 3,228,594 | 1/1966 | Amero | 233/7 |
| 3,282,497 | 11/1966 | Schmeidel | 233/7 |
| 3,405,866 | 10/1968 | Amero | 233/14 R |
| 3,501,346 | 3/1970 | Katzen et al. | 233/7 |
| 3,532,264 | 10/1970 | Amero | 233/7 |
| 3,568,919 | 3/1971 | Nielsen | 233/7 |
| 3,568,920 | 3/1971 | Nielsen | 233/7 |
| 3,854,658 | 12/1974 | Probstmeyer | 233/7 |
| 3,967,778 | 7/1976 | Hunwick | 233/7 |
| 4,141,488 | 2/1979 | Gense | 233/7 |
| 4,142,669 | 3/1979 | Burlet | 233/7 |

FOREIGN PATENT DOCUMENTS

| | | | |
|---|---|---|---|
| 2347076 | 11/1977 | France | 233/7 |
| 1369521 | 10/1974 | United Kingdom | 233/7 |
| 1457416 | 12/1976 | United Kingdom | 233/7 |

Primary Examiner—Stanley N. Gilreath
Attorney, Agent, or Firm—Beveridge, DeGrandi, Kline & Lunsford

[57] ABSTRACT

A solid bowl decanter centrifuge of the scroll discharge type comprises a solid bowl which rotates at a first speed, and a scroll conveyor which is rotated within the bowl at a second, slightly different speed for conveying separated solids to a solids discharge end of the bowl. The suspension to be centrifuges, substantially unmixed with a flocculant, is introduced by a stationary feed pipe into a feed compartment which is a radial passage in the conveyor. The feed compartment provides high turbulence and shear forces which mix and expel the suspension and flocculant into the bowl before flocs have formed.

10 Claims, 7 Drawing Figures

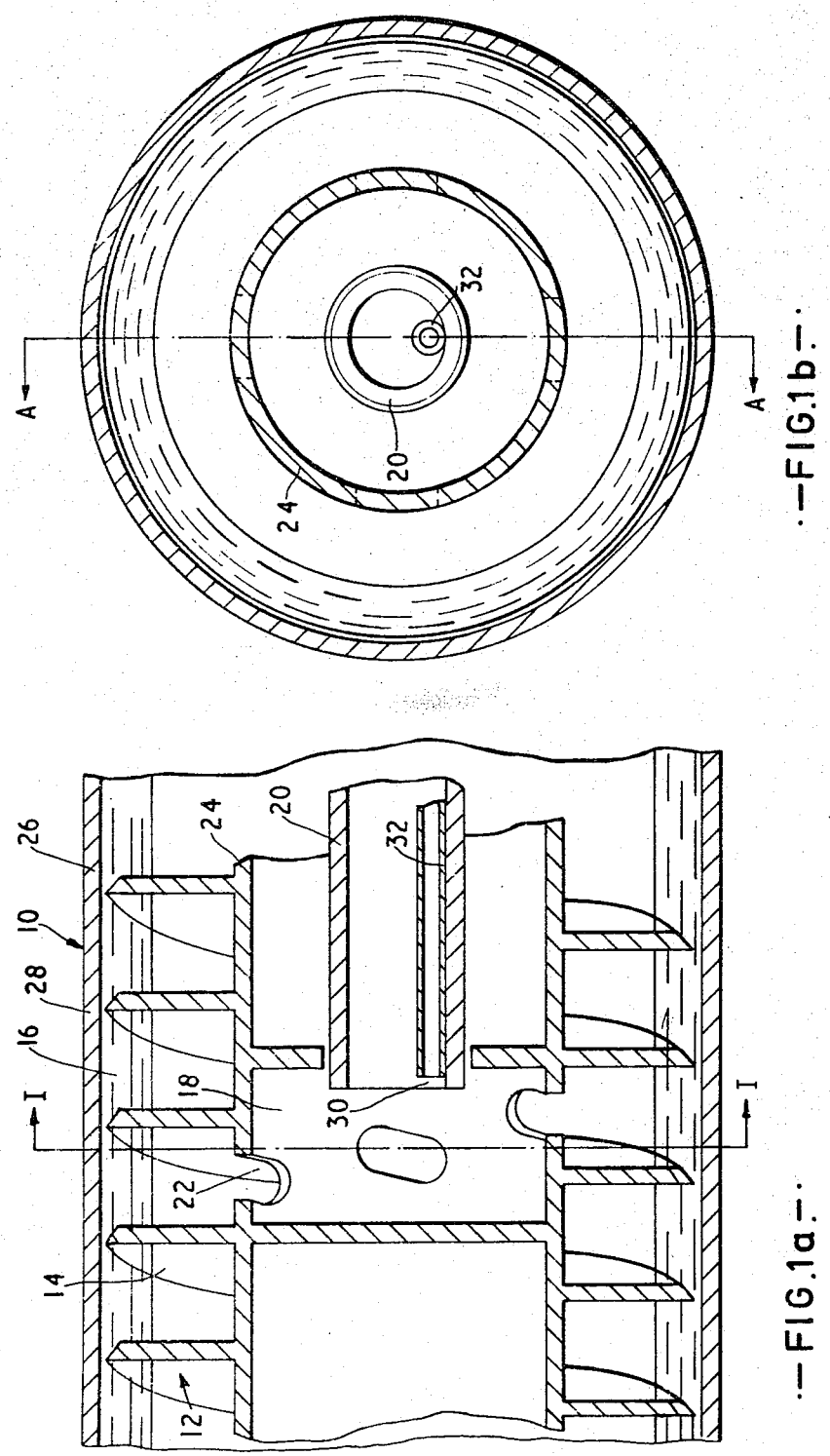
FIG.1a — PRIOR ART
FIG.1b — PRIOR ART

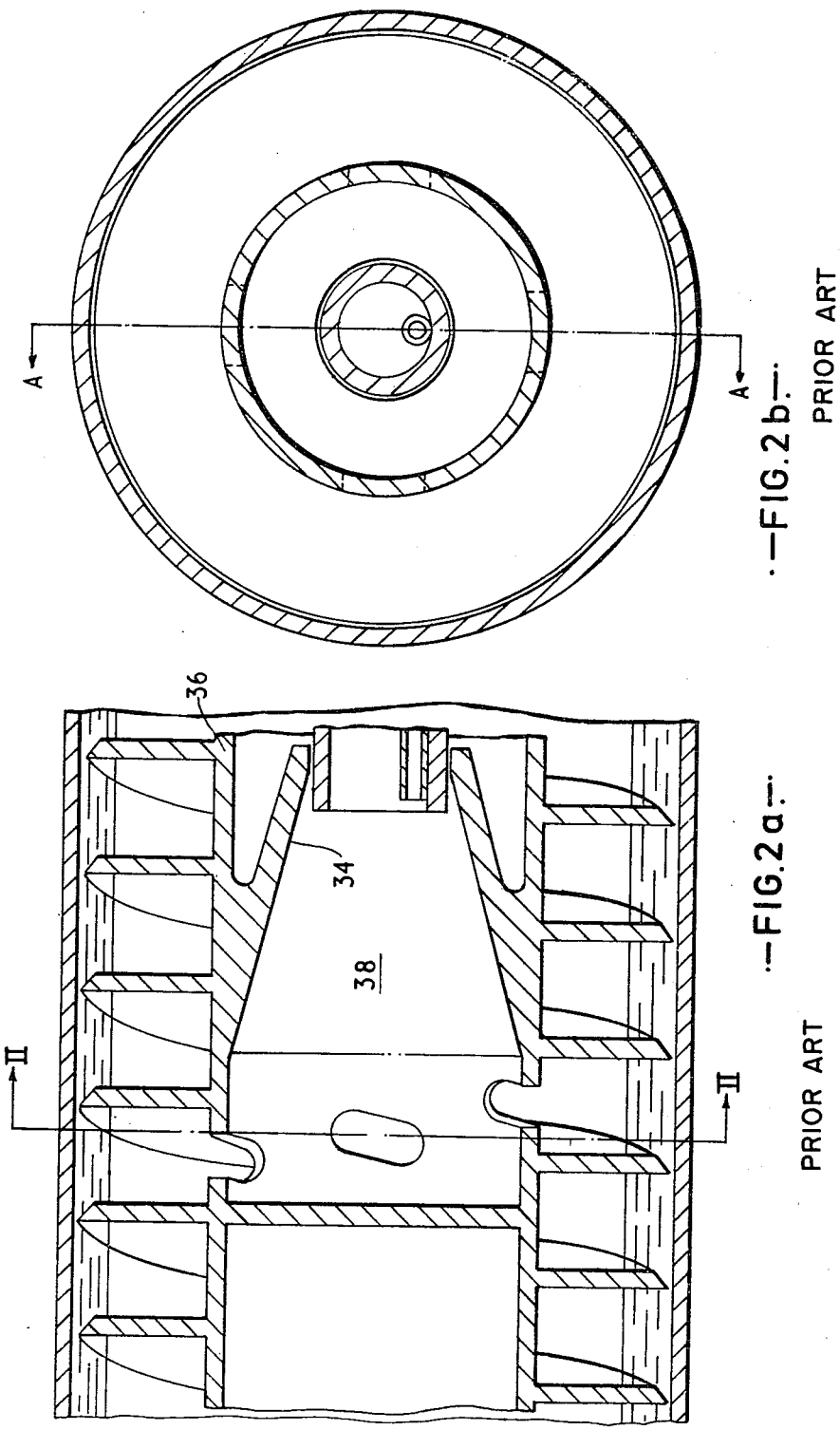
FIG. 2b — PRIOR ART
FIG. 2a — PRIOR ART (4,298,160)

SOLID BOWL DECANTER CENTRIFUGES

REFERENCE TO RELATED APPLICATION

This is a continuation-in-part of U.S. patent application Ser. No. 908,437 filed May 22, 1978, now abandoned.

BACKGROUND OF THE INVENTION

This application relates to solid bowl decanter centrifuges of the scroll discharge type and more specifically to their use in applications entailing sewage sludge dewatering assisted by the addition of polymeric flocculants.

The final dewatering of combined primary, secondary or digested sewage sludges or mixtures of these may be advantageously carried out using solid bowl decanter centrifuges of the scroll discharge type. The process invariably entails conditioning of the sludge by the addition of a polymeric reagent to promote the aggregation of small primary particles to larger aggregates capable of settling under the action of centrifugal force at a greater rate than the primary particles. One of the major problems associated with the use of flocculants in decanter centrifuges concerns the high local shear forces generated in the zone where the solid/liquid suspension enters the rotating bowl and is accelerated to bowl speed. With some flocculants, if the flocculant is added to the suspension prior to its introduction into the machine, then in the presence of velocity gradients and turbulence in the feed zone any flocs which may have formed will experience shear forces causing them to disrupt. With polymerically bridged flocs this disruption is irreversible.

To overcome this problem the introduction of flocculant directly into the centrifuge bowl pond via a separate feed pipe has been suggested. This effectively overcomes the problem of floc disruption but often mixing of suspension and flocculant and the residence time within the bowl after mixing, is inadequate to promote effective conditioning.

Other methods have been proposed where the feed chamber within the conveyor consists of a conical section to provide gradual acceleration of the feed suspension and flocculant. As a further solution in an effort to overcome the turbulence associated with the addition of flocculant to the suspension in or prior to the feed zone, special high shear resistant flocculants have been developed. With these the turbulence occuring in the region of the feed zone effectively aids mixing and can be beneficial to the subsequent flocculation process.

SUMMARY OF THE INVENTION

In accordance with the present invention, the feed compartment coupling the suspension feed pipe to the bowl comprises a substantially radially extending passage arranged such that the suspension is mixed with the flocculant and expelled into the bowl immediately upon leaving the stationary feed pipe, with therefore substantially zero residence time in the feed compartment.

It has been found that the aforegoing arrangement is advantageous compared with the conical type feed chamber accelerators and other known types previously employed in that a reduction in the quantity of polymeric flocculant necessary for conditioning a given quantity of liquid/solid suspension is obtained. Obviously, this is advantageous in the operation of decanter centrifuges in sewage sludge dewatering and can yield a substantial reduction in processing costs.

Preferably, the passage is formed in the interior of the hub so as to rotate therewith but communicates with the stationary feed pipe such that the passage acts as a transversely directed extension of the feed pipe leading directly to the bowl interior.

Advantageously, the passage has a plurality of exit ports, preferably two, communicating with the bowl interior and located at substantially diametrically opposed positions on the conveyor hub. Conveniently, the outlet end of the suspension feed pipe extends into the passage through an aperture in a wall of the passage which extends substantially perpendicularly to the feed pipe.

The method of expressing the amount of flocculant required for conditioning a particular type of sludge is normally expressed in terms of flocculant quantity per unit weight of dry solids processed. The amount of flocculant added is controlled to give a satisfactory effluent discharge from the centrifuge under given conditions of suspension feed rate, centrifuge rotational speed, etc. On this basis a feed compartment in accordance with the invention has been found to yield on average savings of polyelectrolyte consumption of 20% compared with known conventional feed compartment arrangements when assessed under identical operating conditions.

BRIEF DESCRIPTION OF THE DRAWINGS

The invention is described further hereinafter, by way of example, with reference to the accompanying drawings, in which:

FIG. 1a is a longitudinal cross-section through the conveyor hub and feed zone section of a solid bowl decanter centrifuge employing a conventional feed compartment arrangement;

FIG. 1b is a cross-section on the line I—I of FIG. 1a;

FIG. 2a is a view similar to FIG. 1a but showing an embodiment which employs a known conical accelerating section designed to reduce turbulence in the feed zone;

FIG. 2b is a section on the line II—II in FIG. 2a;

FIG. 3b is a section on the line III—III in FIG. 3a; and

BRIEF DESCRIPTION OF PRIOR ART AND A PREFERRED EMBODIMENT

Figure 3B:
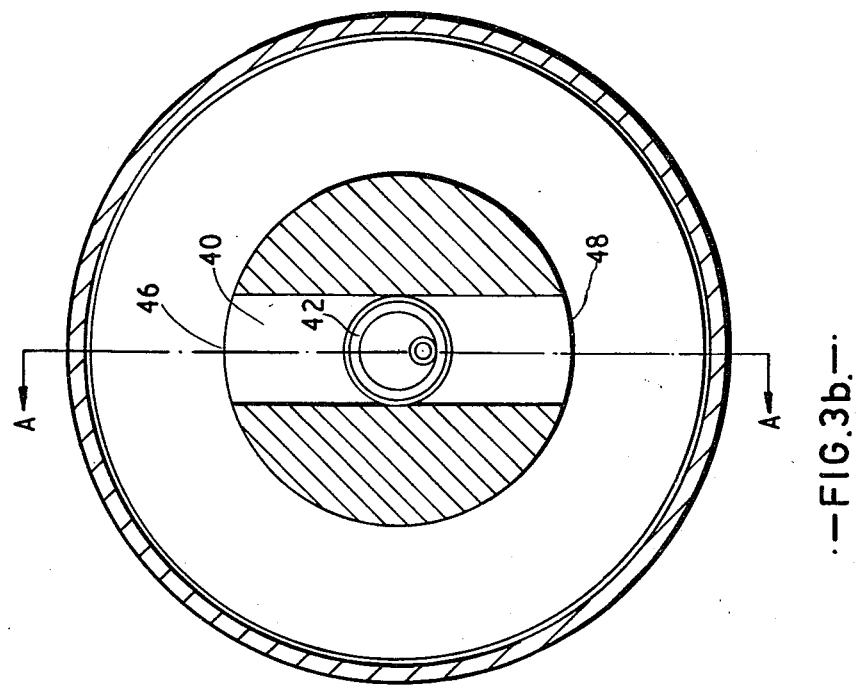

The known arrangement of FIGS. 1a and 1b comprises a solid bowl 10 which is rotatable about a horizontal axis by a drive means (not shown). Coaxially mounted within the bowl 10, for rotation at a slightly different speed from the bowl, is a conveyor comprising a tubular hub portion 12 having a helical scroll flight 14 on its outer surface whose tips lie close to but slightly spaced from the inner surface of the bowl 10. The arrangement is such that, when the bowl and conveyor are rotated at high speed with a small differential speed therebetween a solids/liquid pond 16 is formed by centrifugal action, any solids present being scrolled axially along the bowl (in this case to the left as viewed in FIG. 1a) to a solids discharge port (not shown). The liquid is discharged via a liquid discharge port (not shown) at the opposite end of the bowl.

Suspension is introduced into a feed compartment 18 through a stationary feed pipe 20 coaxially mounted within the tubular hub portion 12 of the conveyor. The suspension in the compartment 18 is accelerated and discharged through one or more ports 22 in the conveyor hub wall 24 into the pool 16 rotating with and within the centrifuge bowl wall 28 where flocculation and subsequent separation under the action of centrifugal force occur. Provision is made for the introduction of flocculant into the feed pipe 20 at a point 30 along its axial length, or alternatively at its discharge end, by a smaller second stationary pipe 32 housed within the main feed pipe 20.

A second known feed compartment arrangement is shown in FIGS. 2a and 2b where a conical section 34 is incorporated within the conveyor hub section 36 to aid gradual acceleration of the feed suspension and flocculant within the feed chamber 38.

It may be seen that both the arrangements illustrated in FIGS. 1a, 1b, 2a and 2b are characterized by a feed chamber in which the feed and flocculant mixture is held for a finite time prior to being discharged into the centrifuge bowl. This delay in discharging into the bowl is increased further in the arrangement illustrated in FIGS. 2a and 2b where the suspension is detained initially in the conical accelerator arrangement.

Figure 3A:
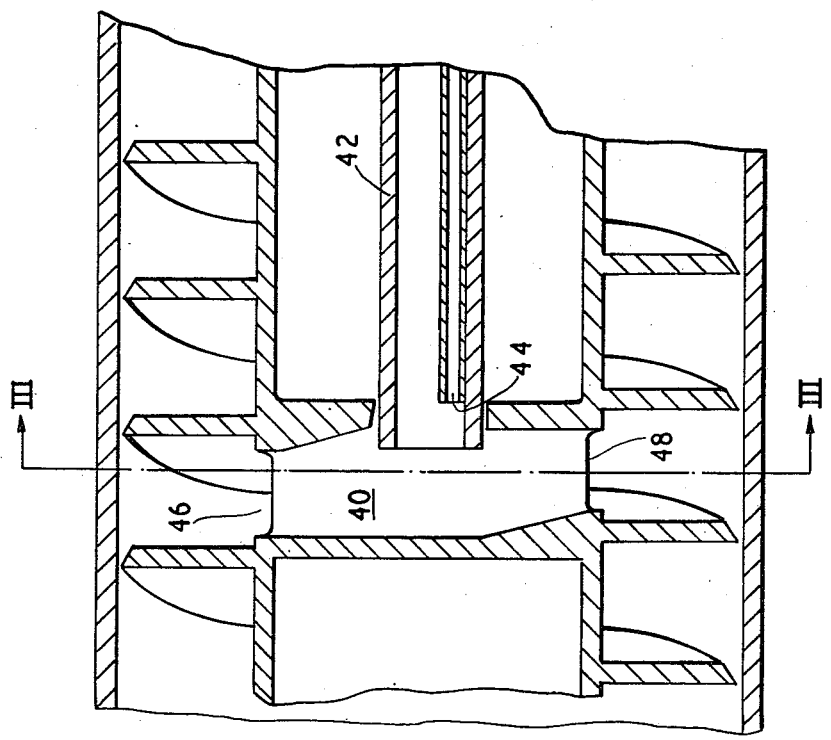
FIG. 3a is a view similar to FIG. 2 but showing an embodiment in accordance with the present invention yielding a reduction in flocculant dosage requirements.

In the evaluation of alternative feed chamber arrangements it has been found in the case of cationic polyelectrolytes having high shear resistance and normal primary, secondary and digested sewage sludges and mixtures of these that improved performance in terms of flocculant dosage requirement is achieved by arranging for the residence time within the feed chamber to be extremely short, but for the turbulence and shear forces to be high. This condition is satisfied by the preferred arrangement in accordance with the present invention shown in FIGS. 3a and 3b wherein the feed chamber 40 is a substantially radial passage approximately at right angles to the rotational axis, providing oppositely extending radial passage leading from the outlet of feed pipe 42 to two exit ports 46 and 48 located at diametrically opposite positions on the conveyor hub. The flocculant is introduced into the suspension by a stationary feed pipe which has an outlet 44 located in the end of the feed pipe 42 or at a location upstream or downstream therefrom which will cause the suspension entering feed chamber 40 to be substantially unmixed with the flocculant.

The unmixed suspension and flocculating additive enter feed chamber 40 and collide with the transverse interior chamber wall which is downstream of and aligned with the outlet of feed pipe 42. This collision causes high turbulence and high shear forces which substantially immediately mix the suspension and flocculating additive. The configuration of feed chamber 40 prevents any significant axial and circumferential movement of the suspension in the scroll. This delivery of the mixed suspension and flocculant into the centrifuge bowl so quickly follows the mixing action, the residence time of the mixture in the feed chamber is substantially zero. The mixture is delivered into the bowl substantially immediately, before any substantial floc formation has occurred. This is unlike the known arrangements, typified by FIGS. 1a, 1b, 2a and 2b, where the feed and flocculant mixture is deliberately held for a relatively long period in the feed chamber prior to being discharged into the bowl interior.

The arrangement shown is for a single flight conveyor in which the two diametrically opposite discharge openings 46, 48 communicating with the bowl interior are necessarily staggered axially to permit incorporation within the space between adjacent conveyor flights. In the case of two start flight conveyors, the openings 46, 48 may be directly opposite one another.

Figure 4:
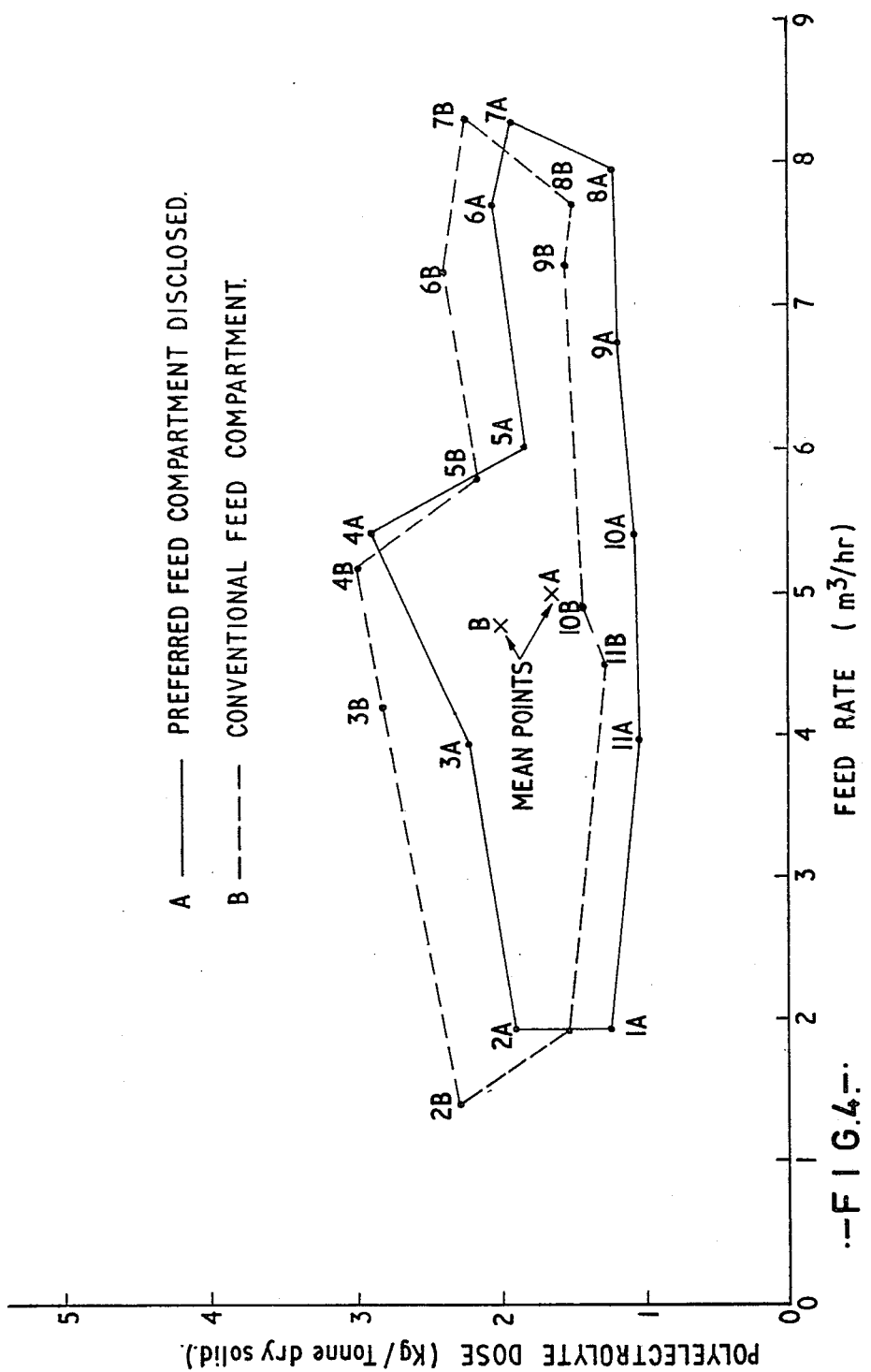
FIG. 4 is a diagram giving best results to illustrate the improvement provided by the present arrangement.

The results of comparison tests between two identical, solid bowl scroll discharge decanter centrifuges are represented graphically in FIG. 4 where the necessary flocculant dosage to achieve an acceptable effluent, expressed in terms of dry solids processed, is shown against feed suspension throughput. The machines differ solely in the construction of their feed compartments. Test results B apply to a conventional feed compartment arrangement and test results A to the preferred arrangement of the type disclosed. To minimize the effects of variation in processed sludge characteristics, tests were conducted simultaneously on the two machines, the results obtained being denoted by an identical reference numeral.

From FIG. 4 it may be observed that the decanter centrifuge having the preferred feed compartment arrangement required on average 20% less flocculant to yield an acceptable effluent clarity compared with the machine employing a conventional feed compartment arrangement. The improved performance of the new feed compartment disclosed in terms of reduced flocculant dosage is attributed to the rapid acceleration and mixing of the feed suspension and flocculant. Since the time over which the feed suspension and flocculant is subjected to high shear velocities is short, the formation of polymerically bridged flocs during this initial mixing period is reduced, subsequently reducing the disruption of floc bonds. The disruption of polymerically bridged flocs is an irreversible process and its prevention permits an effective improvement in flocculation within the centrifuge bowl yielding a reduction in the dosage required.

I claim:

1. A method of centrifuging comprising the steps of rotating a bowl decanter at a first speed; rotating a scroll conveyor within the bowl at a second, slightly different speed for conveying separated solids to a solids discharge end of the bowl; introducing the suspension to be centrifuged into a feed compartment formed in a hub portion of the scroll conveyor; introducing a flocculating additive to the feed compartment substantially separate from the suspension; mixing said suspension and flocculating additive within said feed compartment; and delivering said mixed suspension and flocculating additive from the feed compartment to the bowl before substantial flocs have been formed.

2. The method of claim 1, wherein said mixing step is performed by subjecting the suspension and flocculating additive to turbulence and high shear forces.

3. The method of claim 1, wherein said mixing step is performed by colliding said suspension and flocculating additive against a transverse interior wall in said feed compartment to cause turbulence and high shear forces.

4. The method of centrifuging of claim 3 wherein said delivery step so quickly follows said mixing step that the residence time for said mixed suspension and flocculating additive in said feed compartment is substantially zero.

5. In a bowl decanter centrifuge of the scroll discharge type comprising a solid bowl, means for rotating said bowl at a first speed, a scroll conveyor, means for rotating the conveyor within the bowl at a second, slightly different speed for conveying separated solids to a solids discharge end of the bowl, a feed compartment formed in a hub portion of the scroll conveyor and communicating with the interior of the bowl through an aperture in the conveyor hub portion, a feed pipe for introducing to the feed compartment a suspension which is to be centrifuged, means for introducing a polyelectrolyte additive into the suspension so that the suspension entering the feed compartment is substantially unmixed with the additive, said feed compartment having a transverse interior wall surface and oppositely extending radial passage means, said transverse interior wall surface being aligned with and immediately downstream of the outlet of the feed pipe to create an area of high turbulence and high shear forces to mix the suspension and polyelectrolyte additive, said radial passage means extending directly from the feed pipe to prevent axial and circumferential movement of the suspension in the scroll and to deliver the mixed suspension and additive substantially immediately in opposite directions from the feed pipe into the bowl.

6. A solid bowl decanter centrifuge of the scroll discharge type comprising a solid bowl, means for rotating said bowl at a first speed, a scroll conveyor, means for rotating the conveyor within the bowl at a second, slightly different speed for conveying separated solids to a solids discharge end of the bowl, a feed compartment formed in a hub portion of the scroll conveyor and communicating with the interior of the bowl through an aperture in the conveyor hub portion, a stationary feed pipe for introducing to the interior of the feed compartment a suspension which is to be centrifuged, means for introducing into the suspension prior to its introduction to said feed compartment a flocculating additive which is substantially unmixed with the suspension entering the feed compartment, said feed compartment consisting essentially of a substantially radially extending passage disposed to expel the suspension and additive into the bowl immediately after they leave the stationary feed pipe with, therefore, substantially zero residence time in said feed compartment.

7. A centrifuge according to claim 6, in which said radially extending passage is formed in the interior of the hub so as to rotate therewith but communicates with the stationary feed pipe such that said radially extending passage acts as a transversely directed extension of said suspension feed pipe leading directly to the bowl interior.

8. A centrifuge according to claim 7, in which said radially extending passage has two exit ports communicating with the bowl interior located at substantially diametrically opposed positions on the conveyor hub.

9. A centrifuge according to claim 6, in which the outlet end of the feed pipe extends into said radially extending passage through an aperture in a wall of said radially extending passage which lies substantially perpendicular to the feed pipe.

10. A centrifuge according to claim 6 in which the means for introducing a polyelectrolyte additive into the suspension includes a second stationary feed pipe which discharges into the end of said first stationary feed pipe adjacent said feed compartment.

* * * * *

UNITED STATES PATENT AND TRADEMARK OFFICE
CERTIFICATE OF CORRECTION

PATENT NO. : 4,298,160
DATED : November 3, 1981
INVENTOR(S) : JOSEPH FENWICK JACKSON It is certified that error appears in the above—identified patent and that said Letters Patent is hereby corrected as shown below:

ON THE COVER PAGE, THE FOLLOWING SHOULD BE ADDED:

[30] Foreign Application Priority Data

May 24, 1977 [GB] United Kingdom....21769/77

Signed and Sealed this

Twenty-sixth Day of January 1982

[SEAL]

Attest:

Attesting Officer

GERALD J. MOSSINGHOFF

Commissioner of Patents and Trademarks